United States Patent Office 2,830,958
Patented Apr. 15, 1958

2,830,958

PREPARATION OF SOLID COMPOSITES

Maurice J. Murray, Palatine, and Carl B. Linn, Riverside, Ill., assignors to Universal Oil Products Company, Des Plaines, Ill., a corporation of Delaware No Drawing. Application April 27, 1955
Serial No. 504,378

1 Claim. (Cl. 252—433)

This invention relates to the preparation of solid composites and more particularly to the preparation of solid composites of a complex of boron halide and metal halide with a support.

Complexes of boron halide and metal halide, preferably in the low valence state, when utilized in conjunction with hydrogen halide, are active catalysts for effecting conversion of hydrocarbons and other organic compounds. For example, a very effective catalyst comprises a complex of boron trifluoride and ferrous fluoride in conjunction with hydrogen fluoride. This complex is a non-fuming white solid and is stable at ordinary temperature and pressure. However, it loses boron trifluoride when heated, gradually at first and substantially at 50° C. at atmospheric pressure.

In a preferred method of operation, a solid bed of the complex is dispersed in a reaction zone, and the hydrocarbons or other organic compounds to be converted are passed therethrough in either upward or downward flow. When the complex is utilized as a fixed bed, it preferably is formed into particles of definite size and shape. However, because the complex loses boron trifluoride, for example, when heated to an elevated temperature, conventional methods of commingling a pilling agent, such as Sterotex (hydrogenated vegetable oil), pilling and then burning out the pilling agent cannot be employed. Furthermore, with an active catalyst component as formed by the complex of the present invention, improved effectiveness is obtained when the active catalytic component is dispersed on a support or carrying material. However, conventional methods of preparing the mixture of complex and support cannot be employed because of the limitation that the complex cannot be heated to a high temperature.

From the above description, it will be noted that the preparation of the composite of complex and support presents novel problems which are not encountered in the usual manufacture of supported catalysts. We have found an improved method of preparing such composites.

In one embodiment, the present invention relates to a method of preparing a solid composite of a complex of boron halide and metal halide with a support, which comprises compositing a metal with said support, thereafter converting said metal to the metal halide and reacting with boron halide to form said complex.

In a specific embodiment, the present invention relates to a method of preparing a solid composite of a complex of boron trifluoride and ferrous fluoride with charcoal, which comprises soaking particles of charcoal in an aqueous solution of ferric chloride, removing excess solution, reacting ammonia with said particles to form ferric hydroxide, reducing the ferric hydroxide with hydrogen to form a solid composite of iron dispersed on charcoal, reacting the same with hydrogen fluoride to form ferrous fluoride and reacting with boron trifluoride to form said complex.

It will be noted that the first step in the preparation comprises forming a composite of a metal and the support, the metal corresponding to the metal halide desired in the complex. Any suitable support may be utilized and preferably is a porous material so that a high surface area is provided. This results in improved utilization of the active catalytic component dispersed upon and within the support. A particularly preferred support comprises activated charcoal. Any suitable carbonaceous support may be utilized and may be selected from charcoals or chars prepared from wood, nut shells, bone, etc., coke prepared from petroleum, coal, etc., carbons including carbon black, lamp black, graphite, etc., lignites, coal, bagasse, etc. It is understood that the carbonaceous support may be in the form of particles of different size and shape formed by grinding, chopping, etc., or of particles of uniform size and shape formed by pelleting, extrusion, etc. Other supporting materials include, for example, metal fluorides such as aluminum fluoride, calcium fluoride, magnesium fluoride, strontium fluoride, barium fluoride, etc. Still another supporting material is a special hydrogen fluoride resistant glass. Such a glass would be employed in a fibrous state.

It is understood that the support may comprise other metal fluorides which will not be substantially dissolved, removed or otherwise adversely affected upon contact with hydrogen halide, and particularly hydrogen fluoride, utilized as a component of the catalyst. Similarly, the other halides, including chlorides, bromides and/or iodides, of the metals specifically set forth above or of other metals may be utilized providing they meet the requirements hereinbefore set forth. Furthermore, metal oxides or other metal compounds may be employed provided they will retain satisfactory physical properties during use. In some cases, the metal oxide or other metal compound may in part react with the hydrogen halide but will retain its physical properties to provide a suitable supporting material. It is understood that the various supports are not necessarily equivalent and that the particular support to be used will be selected with regard to the specific complex and hydrogen halide utilized as the catalyst.

The metal may be composited with the support in any suitable manner. As hereinbefore set forth, a complex comprising ferrous fluoride and boron trifluoride is particularly preferred. In this embodiment, a preferred method of compositing the iron with the support is by soaking, suspending, immersing, dipping, etc., the support particles in an aqueous solution of ferric chloride or other soluble iron salt for a time sufficient to distribute the iron salt throughout the support, after which excess solution is removed, and the resultant support is treated to convert the iron salt to metallic iron. Instead of soaking the support particles in the solution of iron salt, the iron salt solution may be sprayed, poured or otherwise passed through a bed of the support particles. When desired, the mixture of solution and particles may be mixed by suitable mechanical means including, for example, mixing paddles, etc., or the use of a rotating mixing zone. As hereinbefore set forth, the time of contact will be sufficient to effect complete dispersion of the iron salt upon and within the support and may range, for example, from 10 minutes to 48 hours or more. The contacting preferably is effected at ambient temperature, although elevated temperature may be employed, which temperature usually will be below about 100° C. at atmospheric pressure. However, it is understood that superatmospheric pressure may be employed and this in turn will permit the use of a higher temperature with liquid phase contacting.

When iron chloride is utilized as the salt solution, a particularly preferred method of converting the same to metallic iron is to remove the excess solution, treat the remaining solid with ammonia to convert the ferric chloride to ferric hydroxide, dry the composite and then reduce with hydrogen to form a support containing the iron dispersed therein. While ammonia or ammonium hydroxide is preferred for converting ferric chloride to ferric hydroxide, it is understood that other suitable reagents may be employed for this purpose. The drying may be effected at any suitable temperature and for a time sufficient to effect substantial drying, and thus the temperature may range from about 100° to 400° C. or more for a period of from about 0.5 to 48 hours or more. Reduction of the salt to iron preferably is effected with hydrogen at a temperature of from about 300° to 700° C. or more for a period of from about 0.5 to 18 hours or more. It is understood that this reduction may be effected in any suitable manner. The iron formed by the method described herein is exceptionally active, often pyrophoric, and reacts readily with hydrogen fluoride and boron fluoride to form the complex.

While ferric chloride is preferred, it is understood that other suitable salts of iron may be utilized, including both organic and inorganic salts. Other soluble inorganic salts include ferrous bromide, ferric bromide, ferrous iodide, ferric nitrate, etc., and particularly the hydrated forms thereof. Ferric chloride is particularly preferred as the inorganic salt because of its ready solubility in aqueous solutions and the preparation of especially active iron as hereinbefore set forth. Soluble organic salts of iron include ferrous acetate, ferric citrate, ferrous formate, ferric malate, ferric oxalate, ferrous tartrate, etc. While aqueous solutions are preferred, it is understood that, in some cases, solutions in organic solvents may be employed including, for example, alcohols, ethers, ketones, aldehydes, etc.

When an organic salt of iron is used, the salt may be commingled with the support and then dried and calcined in the absence of air to decompose the salt and to form a composite of iron dispersed throughout the support. The drying may be effected at the temperature hereinbefore set forth and the calcining at a temperature of from about 300° to 700° C. or more, either in an inert or a reducing atmosphere.

In another embodiment, iron composited with carbon may be formed by pyrolysis of ferric tartrate, ferric citrate, ferric lactate, ferric malate or other organic salt to form finely divided iron already mixed with a carbon base. In still another embodiment, an organic salt of iron may be commingled with an aqueous solution of an organic compound, such as sucrose, etc., and then decomposed by pyrolysis to leave a carbon base containing iron dispersed therein.

In still another embodiment, instead of using a salt of iron, a ferric oxide sol may be employed. The sol may be intimately mixed with the support particles as, for example, by mulling, after which the mixture is dried and reduced. The drying and reducing may be effected at the conditions hereinbefore set forth.

From the above description, it will be noted that any suitable method of forming a composite of active metal with the support may be employed in accordance with the present invention. Furthermore, it is understood that these various methods are not necessarily equivalent.

While the heretofore description has been directed primarily to the preparation of a composite of iron and a support, it is understood that the same general method may be employed for the preparation of a composite of a support and other suitable metal, including particularly nickel and cobalt. Still other metals which may be employed include platinum, palladium, chromium, molybdenum, tungsten, vanadium, tantalum, titanium, zirconium manganese, etc. These composites may be prepared by utilizing either an inorganic salt or organic salt of these metals or a sol or other compound thereof.

Soluble salts of the other metals specifically set forth above include nickel bromide, nickel chloride, nickel iodide, nickel nitrate, etc., nickel acetae, nickel formate, etc., cobaltous bromide, cobaltous chloride, cobaltous chlorate, cobaltous iodide, etc., cobaltous acetate, cobaltous benzoate, etc., platinic chloride, chloroplatinic acid, etc., palladium chloride, etc., chromic bromide, chromous chloride, chromic chloride, chromous iodide, chromic nitrate, etc., chromic acetate, chromous oxalate, etc., molybedenum tetrabromide, molybedenum oxydibromide, molybedenum oxydichloride, molybedenum oxytetrachloride, etc., tungsten oxydichloride, etc., vanadium tribromide, vanadium oxydibromide, vanadium oxytribromide, etc., tantalum fluoride, etc., titanium dibromide, titanium chloride, titanium tetraiodide, etc., titanium oxalate, etc., zirconyl bromide, zirconyl chloride, zirconyl iodide, etc., zirconium acetate, etc., manganese dibromide, manganese dichloride, manganese iodide, etc., manganous acetate, manganous formate, manganous lactate, manganese valerate, etc. Here again, in many cases, it is preferred that the hydrated form of the salt be utilized. As hereinbefore set forth, in some cases, a sol of these compounds, particularly the metal oxide sol, may be utilized. It is understood that other suitable compounds of these metals may be employed. These complexes may be prepared in any suitable manner and, in many cases, the preparation may be effected in substantially the same general method as hereinbefore set forth, although with suitable modifications as required. In cases where the metal halide desired in the final complex is soluble in aqueous solutions, particles of the support may be soaked or otherwise contacted with a solution of the metal halide, followed by draining of excess solution and drying of the composite. The complex subsequently formed with these metal halides are not necessarily equivalent.

The complexes formed in accordance with the present invention are of particular utility for use in catalyst compositions. As hereinbefore set forth, these complexes, when utilized in conjunction with hydrogen halide, are very active catalysts for effecting conversion of hydrocarbons and other organic compounds. Thus, with hydrogen fluoride, the complex of boron trifluoride and ferrous fluoride is a very active catalyst for the alkylation of isoparaffins with olefins and particularly isobutane, isopentane, isohexane, etc., or mixtures thereof, with ethylene, propylene, butylene, amylene, etc., or mixtures thereof. This complex, along with hydrogen fluoride, is also a very active catalyst for the isomerization of paraffins including n-butane, n-pentane, n-hexane, etc., or mixtures thereof. Furthermore, the complex along with hydrogen halide may be utilized for catalyzing other condensation or rearrangement reactions, as well as destructive reactions in which a molecule is decomposed into a smaller size molecule or into two or more molecules as, for example, the hydrocracking of oil heavier than gasoline into lower boiling products and particularly gasoline, etc. These and other reactions generally are effected at a temperature within the range from about —50° C. to 300° C. or more and preferably 10° to 150° C., utilizing a pressure within the range from atmospheric to 5000 pounds per square inch or more.

For many reactions, it is necessary to employ both the complex and hydrogen halide as the catalyst. In these reactions, the complex alone does not function as a catalyst. However, for some other reactions, the complex alone functions to catalyze the reactions and, in such cases, the complex may be used either alone or, if desired, along with hydrogen halide.

The hydrocarbons conversion process may be effected in any suitable manner and preferably comprises disposing a fixed bed of complex in a reaction zone and passing the charge, at the desired temperature and pressure, through the complex in either upward or downward flow. Hydrogen halide may be commingled with the charge and thus introduced into the reaction zone or it may be introduced thereto in any other suitable manner.

Following the reaction, the products are fractionated or otherwise separated into the desired product and unconverted fractions, along with excess hydrogen halide, when employed, and the uncovered fractions and hydrogen halide may be recycled to the reaction zone for further use therein. When hydrogen is utilized, the excess hydrogen likewise is separated from the converted products and preferably is recycled to the reaction zone. Instead of a fixed bed operation described above, a fluidized type operation, suspensoid or slurry type operation, or moving catalyst bed type of operation may be employed.

The following examples are introduced to illustrate further the novelty and utility of the present invention but not with the intention of unduly limiting the same.

*Example I*

A complex of boron trifluoride and ferrous fluoride composited with charcoal was prepared in the following manner: 50 cc. of 10–20 mesh activated charcoal was soaked in a solution comprising 50 grams of ferric chloride dissolved in 150 cc. of water at ambient temperature for a period of about one hour. Excess solution was drained. Ammonia gas mixed with air then was passed through the charcoal-ferric chloride mixture for about 3 hours, thereby converting the ferric chloride to ferric hydroxide. The composite of charcoal and ferric hydroxide then was dried at about 150° C. for a period of about 3 hours, after which it was reduced with hydrogen at 500° C. for a period of about 3 hours. The resultant solid now contained finely divided metallic iron dispersed upon and within the charcoal.

31 cc. (5.1 grams) of the charcoal-iron composite prepared in the above manner was placed in a copper liner and 22 grams of hydrogen fluoride added. The copper liner then was sealed into a rotating autoclave and heated and rotated for two hours at 100° C. Following this, the autoclave was allowed to cool, hydrogen pressure released, and 47 grams of boron trifluoride then pressured in, followed by contacting for 51 hours at ambient temperature, with occasional rotating of the autoclave. The pressure was released while warming the autoclave in a water bath at 40° C., after which the solid product was withdrawn. The product was non-fuming and is stable at ordinary temperature and pressure.

The composite of complex and charcoal prepared in the above manner was utilized along with hydrogen fluoride in a continuous run for the alkylation of isobutane with propylene. Liquid isobutane saturated with hydrogen fluoride was passed through the complex for 30 minutes at 2 hourly liquid space velocity. The isobutane was saturated with hydrogen fluoride by being passed through a pool of liquid hydrogen fluoride at 25° C. Following this, propylene along with isobutane saturated with hydrogen fluoride was charged to the reactor at a liquid hourly space velocity of 3 for slightly over 2½ hours. The introduction of hydrogen fluoride then was discontinued, and the isobutane was supplied directly to the reactor along with propylene. This run was continued for a period of slightly over 3 hours at a liquid hourly space velocity of 7. In the latter run, the yield of alkylate amounted to about 140% based upon the propylene charged. This yield does not include the $C_5+$ in the condensible gas fraction, which fraction was not analyzed.

*Example II*

A complex comprising boron trifluoride and nickel fluoride may be prepared in substantially the same manner as described in Example I. An aqueous solution of nickel chloride is prepared, and finely divided activated charcoal is soaked therein. After draining excess solution, ammonia gas is passed through the solid to convert the nickel chloride to nickel hydroxide. The solid then is dried, after which it is reduced with hydrogen at 500° C. The resultant composite comprising finely divided nickel dispersed on and within the charcoal is heated with hydrogen fluoride for 2 hours at 100° C. Following this, boron trifluoride is added and the mixture contacted for 24 hours to form the complex of nickelous fluoride and boron trifluoride.

*Example III*

This example illustrates the use of an organic salt of iron in the preparation of the complex. Finely divided charcoal is soaked in an aqueous solution of ferric citrate, excess solution then is drained off, and the resultant solid is dried at 150° C. and calcined in a hydrogen atmosphere at a temperature of 600° C., thereby forming a composite of finely divided iron and charcoal. Hydrogen fluoride and boron trifluoride then are commingled with the composite of iron and charcoal, and the resultant mixture heated and contacted at 100° C. for 30 hours.

*Example IV*

The complex of this example comprises chromous iodide and boron iodide composited with activated charcoal. The activated charcoal particles are soaked in an aqueous solution of chromous iodide, excess solution drained, and the composite dried. The composite then is treated with boron iodide, preferably along with hydrogen iodide, to form the complex of chromous iodide and boron iodide composited with the charcoal support.

*Example V*

The complex of this example comprises manganese chloride and boron chloride composited with aluminum oxide. The aluminum oxide is prepared as finely divided porous material. The aluminum oxide particles are soaked in an aqueous solution of $MnCl_2 \cdot 4H_2O$, for 16 hours, after which excess solution is drained and the mixture heated at 250° C. for 8 hours to form a composite of manganese chloride intimately dispersed throughout the aluminum oxide support. The composite of manganese chloride and aluminum oxide then is reacted with boron chloride to form a complex of manganese chloride-boron chloride. This complex, along with hydrogen halide, may be utilized as a catalyst for reactions effected at temperatures below about 10° C.

We claim as our invention:

A method of preparing a solid composite of a complex of boron trifluoride and ferrous fluoride with charcoal, which comprises soaking particles of charcoal in an aqueous solution of ferric chloride, removing excess solution, reacting ammonium hydroxide with said particles to form ferric hydroxide, reducing the ferric hydroxide with hydrogen to form a solid composite of iron dispersed on charcoal, reacting the same with hydrogen fluoride to form ferrous fluoride and reacting with boron trifluoride to form said complex.

References Cited in the file of this patent

UNITED STATES PATENTS

| | | |
|---|---|---|
| 2,092,295 | Peski et al. | Sept. 7, 1937 |
| 2,097,482 | Weber | Nov. 2, 1937 |
| 2,142,980 | Huijser et al. | Jan. 3, 1939 |
| 2,217,019 | Ipatieff et al. | Oct. 8, 1940 |
| 2,416,106 | Linn et al. | Feb. 18, 1947 |